United States Patent Office 2,832,760
Patented Apr. 29, 1958

2,832,760

METALLIFEROUS AZO-DYESTUFFS

Christian Zickendraht, Binningen, and Alfred Fasciati, Bottmingen, Switzerland, assignors to Ciba Limited, Basel, Switzerland, a Swiss firm No Drawing. Application January 10, 1955
Serial No. 481,038

Claims priority, application Switzerland January 15, 1954

10 Claims. (Cl. 260—145)

This invention is based on the observation that valuable new metalliferous azo-dyestuffs are obtained by treating with an agent yielding chromium a mixture of two different monoazo-dyestuffs, of which one corresponds to the general formula (1) 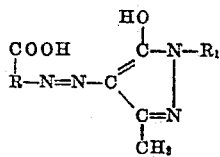

in which R represents a benzene radical which is bound to the azo linkage in ortho-position relatively to the —COOH group and is free from groups imparting solubility in water, and $R_1$ represents a benzene radical which is free from groups imparting solubility in water, is bound in the 1-position to the pyrazolone ring and contains in the 2-position a substituent not imparting solubility in water, and the other of which dyestuffs is an ortho-carboxy-ortho'-hydroxy-monoazo-dyestuff free from sulfonic acid groups or an ortho:ortho'-dihydroxy-monoazo-dyestuff free from sulfonic acid and carboxylic acid groups.

The monoazo-dyestuffs of the above Formula 1 and serving as starting materials in the process of this invention, can be obtained by coupling a diazotized 2-aminobenzene-1-carboxylic acid, which may contain substituents not imparting solubility in water, such as a nitro or alkoxy group or a halogen atom, for example, a chlorine atom, with a 1-phenyl-3-methyl-5-pyrazolone which is free from groups imparting solubility in water and contains in the 2'-position and, if desired, also in the 6'-position of the phenyl residue bound in the 1'-position to the pyrazolone ring a nitro, alkyl or alkoxy group or a halogen atom.

As examples of such 1-phenyl-3-methyl-5-pyrazolones there may be mentioned:

1-(2'-nitrophenyl)-3-methyl-5-pyrazolone
1-(2':4'-dimethylphenyl)-3-methyl-5-pyrazolone
1-(2':6'-dichlorophenyl)-3-methyl-5-pyrazolone
1-(2':5'-dichlorophenyl)-3-methyl-5-pyrazolone
1-(2':6'-dimethylphenyl)-3-methyl-5-pyrazolone
1-(2'-methyl-6'-chlorophenyl)-3-methyl-5-pyrazolone
1-(2'-methyl-6'-methoxyphenyl)-3-methyl-5-pyrazolone
1 - (2' - chloro - 6' - methoxyphenyl) - 3 - methyl - 5-pyrazolone and advantageously
1-(2'-methyl- or -ethylphenyl)-3-methyl-5-pyrazolone
1-(2'-bromo- or -chlorophenyl)-3-methyl-5-pyrazolone
1-(2'-methoxyphenyl)-3-methyl-5-pyrazolone As examples of 2-aminobenzene-1-carboxylic acids there come into consideration, for example, 4- or 5-nitro-2-aminobenzene-1-carboxylic acid, 4-methoxy-2-aminobenzene-1-carboxylic acid, 5-chloro-2-aminobenzene-1-carboxylic acid and above all 2-aminobenzene-1-carboxylic acid itself.

The diazotized 2-aminobenzene-1-carboxylic acids may be coupled with the pyrazolones by the usual known methods, for example, in a weakly acid to alkaline medium.

The dyestuffs used in admixture with the dyestuffs of the above Formula 1 may be obtained from components free from sulfonic acid groups. Especially valuable results are obtained with mixtures of a dyestuff of the above Formula 1 with a dyestuff of the formula (2) 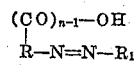

in which $n$ represents a whole number not greater than 2, R represents a benzene residue which is free from sulfonic acid and carboxylic acid groups and is bound to the azo linkage in ortho-position relatively to the group —$(CO)_{n-1}$—OH, and $R_1$ represents the residue of a coupling component which is free from sulfonic acid and carboxylic acid groups and is bound to the azo linkage in a position vicinal to a hydroxyl group.

The monoazo-dyestuffs of the Formula 2, which are used as starting materials together with dyestuffs of the Formula 1 in the form of the process referred to in the preceding paragraph, can be obtained by coupling an ortho-carboxy- or ortho-hydroxy-diazo-compound of the benzene series with a coupling component capable of coupling in a position vicinal to a hydroxyl group. As examples of diazo-compounds of the benzene series there may be mentioned those of the following amines:

2-aminobenzene-1-carboxylic acid
6-acetylamino-4-nitro-2-amino-1-hydroxybenzene
6-nitro-4-acetylamino-2-amino-1-hydroxybenzene
4-nitro- or 5-nitro-2-amino-1-hydroxybenzene
4:6-dinitro- or -dichloro-2-amino-1-hydroxybenzene
4-nitro-6-chloro-2-amino-1-hydroxybenzene
4-chloro-5-nitro-2-amino-1-hydroxybenzene
2-amino-1-hydroxybenzene-4- or -5-phenyl sulfone
2-amino-1-hydroxybenzene-4- or -5-methyl sulfone and
2-amino-1-hydroxybenzene sulfonic acid amides As azo components capable of coupling in ortho-position to a hydroxyl group there come into consideration aromatic hydroxy-compounds, for example, phenols and naphthols, and also keto-methylene compounds. As examples there may be mentioned:

5-chloro-1-hydroxynaphthalene
2-hydroxynaphthalene
6-methoxy- or 6-bromo-2-hydroxynaphthalene
1-acetyl-, 1-n-butyryl- or 1-benzoylamino-7-hydroxynaphthalene
5:8-dichloro-1-hydroxynaphthalene
1 - hydroxynaphthalene - 3:6 - di - (sulfonic acid methylamide), but advantageously
1-phenyl-3-methyl-5-pyrazolone
1-(2'-, 3'- or 4'-chlorophenyl)-3-methyl-5-pyrazolone 1-phenyl-5-pyrazolone-3-carboxylic acid amides, and 5-pyrazolone-3-carboxylic acid-n-butylamide As agents yielding chromium there come into consideration, for example, simple chromium salts, such as chromium fluoride, chromium sulfate or chromium acetate, and also complex chromium compounds of aliphatic dicarboxylic acids or hydroxy-carboxylic acids or advantageously complex chromium compounds of aromatic ortho-hydroxy-carboxylic acids. As examples of aliphatic dicarboxylic acids or hydroxy-carboxylic acids there may be mentioned, inter alia, oxalic acid, lactic acid, glycollic acid, citric acid and especially tartaric acid, and as aromatic ortho-hydroxy-carboxylic acids there may be mentioned, for example, those of the benzene series such as 4-, 5- or 6-methyl-1-hydroxy-benzene-2-carboxylic acid and above all 1-hydroxybenzene-2-carboxylic acid itself.

The treatment with the agent yielding chromium is advantageously carried out in such manner that chromiferous dyestuff is formed which contains, per molecular proportion of monoazo-dyestuff, less than one and advantageously one half atomic proportion of chromium in complex union. In carrying out the process it is usually of advantage to treat a mixture of about 1 molecular proportion of each of the two different dyestuffs defined above with a proportion of the agent yielding chromium corresponding to about one atomic proportion of chromium and/or to carry out the chroming treatment in a weakly acid to alkaline medium.

The conversion of the dyestuffs into the complex chromium compounds is advantageously conducted at a raised temperature and under atmospheric or superatmospheric pressure, for example, at the boiling temperature of the reaction mixture, if desired, in the presence of a suitable addition, for example, in the presence of a salt of an organic acid, or of a base, organic solvent or other agent assisting the formation of the complex.

The dyestuffs obtained according to the aforementioned process can also be prepared according to a modification of this process by reacting a metal-free monoazo-dyestuff of the Formula 1 with a chromium complex compound of a monoazo-dyestuff of the Formula 2 containing per molecular proportion of dyestuff about one atomic proportion of chromium in complex union.

The chromium compounds of the dyestuffs of the Formula 2 containing per molecular proportion of dyestuff about one atomic proportion of chromium in complex union used as starting material in this modification of the process, are so-called 1:1-complexes which can be prepared by usual methods known in themselves, for example by reacting the monoazo-dyestuffs free from complex-forming metal in an acid medium with an excess of a chromium salt, advantageously a salt of a trivalent chromium, such as chromium sulfate or chromium fluoride, at boiling temperature or if desired at a temperature exceeding 100° C. For the conversion of the metal-free dyestuffs into the 1:1-complexes it is advisable as a rule to carry out the chroming treatment in the presence of an organic solvent, such as for example alcohol or formamide.

The reaction of the so obtained 1:1-chromium complexes with the metal-free dyestuffs is carried out advantageously in an aqueous, neutral to weakly alkaline medium, at ordinary or raised temperature. It is advisable as a rule to react equivalent quantities of the chromiferous 1:1-complex and of the metal-free dyestuff, or to use a certain, at the most 20%, excess of the chromiferous dyestuff.

The new products obtainable by the process of this invention and the modification thereof are mixed complexes, that is to say, complex chromium compounds which contain two different monoazo-dyestuffs bound in complex union to one atom of chromium, one of which dyestuffs corresponds to the general Formula 1 given above and the other of which is an ortho-carboxy-ortho'- hydroxy-monoazo-dyestuff free from sulfonic acid groups or an ortho:ortho'-dihydroxy-monoazo-dyestuff free from sulfonic acid and carboxylic acid groups.

Especially valuable are the chromium compounds of this kind which contain a monoazo-dyestuff of the general formula

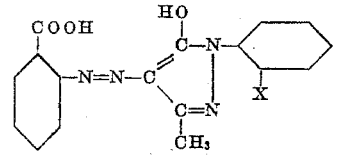

in which X represents an alkyl or alkoxy group of low molecular weight, for example, one containing two carbon atoms, or a halogen atom, more especially a chlorine atom, and a dyestuff of the Formula 2 given above.

The new chromiferous dyestuffs dissolve surprisingly well in water and in weakly acid aqueous media, and in fact dissolve better than the metal-free dyestuffs used for making them. They are suitable for dyeing and printing a very wide variety of materials, above all for dyeing animal materials such as silk, leather and especially wool, but they can also be used for dyeing or printing synthetic fibres of a superpolyamide or superpolyurethane, polyvinyl alcohol etc. The wool dyeings produced with these metalliferous dyestuffs from weakly alkaline, neutral or weakly acid, advantageously acetic acid, baths are distinguished by their level character, good properties of wet fastness and very good fastness to light.

The following examples illustrate the invention, the parts and percentages being by weight unless otherwise stated and the relationship of parts by weight to parts by volume being the same as that of the kilogram to the liter.

*Example 1*

13.7 parts of 2-aminobenzene-1-carboxylic acid are dissolved in 60 parts of water and 24 parts of hydrochloric acid of 30 percent strength, and diazotized at 0–5° C. with an aqueous solution of 6.9 parts of sodium nitrite. The resulting diazo solution is added to a solution, cooled to 10–12° C., consisting of 20.2 parts of 1-(2':6'-dimethylphenyl)-3-methyl-5-pyrazolone, 50 parts by volume of a 2 N-solution of sodium hydroxide, 25 parts by volume of a sodium carbonate solution of 10 percent strength and 100 parts of water. When the coupling is finished the dyestuff formed is filtered off and washed with a dilute solution of sodium chloride. One half of the filter cake so obtained is stirred in 1000 parts of water with 29.2 parts of the dyestuff obtained from β-naphthol and diazotized 2-aminobenzoic acid, and, after the addition of 190 parts of a solution of sodium chromosalicylate having a chromium content of 2.6 percent, the whole is boiled for 24 hours under reflux. After cooling the mixture, the chromiferous dyestuff is isolated by being salted out and filtered off, and is then dried in vacuo. It is a brown powder which dissolves in water with a brown coloration and dyes wool from neutral or acetic acid baths fast yellowish red-brown tints.

The chroming treatment may also be carried out as follows:

The two dyestuffs are stirred in 1000 parts of water, and, after the addition of 28 parts of crystalline sodium acetate and 155 parts of a chromium fluoride solution having a chromium content corresponding to 4.9 percent of $Cr_2O_3$, the whole is boiled for 24 hours under reflux. The resulting chromiferous dyestuff is filtered off and dried. It has properties similar to those of the chromium complex described above.

Similar dyestuffs, which dye wool the tints given in column III of the following table, are obtained by treating with an agent yielding chromium by the methods described above the monoazo-dyestuffs of the formula given in columns I and II:

| | I | II | III |
|---|---|---|---|
| 1 | (structure) | (structure) | Yellow. |
| 2 | (structure) | (structure) | Yellow orange. |
| 3 | (structure) | (structure) | Yellowish red. |
| 4 | (structure) | (structure) | Yellowish red-brown. |
| 5 | (structure) | (structure) | Yellowish brown. |
| 6 | (structure) | (structure) | Orange red. |
| 7 | (structure) | (structure) | Yellow orange. |
| 8 | (structure) | (structure) | Brown. |
| 9 | (structure) | (structure) | Do. |

| | I | II | III |
|---|---|---|---|
| 10 | (structure: COOH-phenyl-N=N-pyrazolone with C₂H₅ phenyl, CH₃) | (structure: OH, O₂N, Cl, SO₂NH-CH₃ phenyl-N=N-naphthyl OH, SO₂NH-CH₃) | Olive. |
| 11 | (structure: COOH-phenyl-N=N-pyrazolone with C₂H₅ phenyl, CH₃) | (structure: OH, H₂N-O₂S phenyl-N=N-naphthyl OH, Cl, Cl) | Do. |
| 12 | (structure: COOH-phenyl-N=N-pyrazolone with C₂H₅ phenyl, CH₃) | (structure: OH, H₂N-O₂S, CH₃ phenyl-N=N-naphthyl OH, Cl, Cl) | Olive green. |
| 13 | (structure: COOH-phenyl-N=N-pyrazolone with C₂H₅ phenyl, CH₃) | (structure: OH phenyl-N=N-naphthyl OH with SO₂-NH-CH₃, HN-COCH₃) | Olive. |
| 14 | (structure: COOH-phenyl-N=N-pyrazolone with Cl phenyl, CH₃) | (structure: COOH-phenyl-N=N-pyrazolone with phenyl, CH₃) | Yellow. |
| 15 | (structure: COOH-phenyl-N=N-pyrazolone with Cl phenyl, CH₃) | (structure: COOH-phenyl-N=N-naphthyl-OH) | Yellowish red-brown. |
| 16 | (structure: COOH-phenyl-N=N-pyrazolone with 2Cl phenyl, CH₃) | (structure: COOH-phenyl-N=N-naphthyl-OH) | Do. |
| 17 | (structure: COOH-phenyl-N=N-pyrazolone with CH₃ phenyl, CH₃) | (structure: COOH-phenyl-N=N-naphthyl-OH) | Do. |
| 18 | (structure: COOH-phenyl-N=N-pyrazolone with Cl, CH₃ phenyl, CH₃) | (structure: COOH-phenyl-N=N-naphthyl-OH) | Do. |

Example 2

100 parts of well wetted wool are entered at 40–50° C. into a dyebath which contains in 4000 parts of water, 1 part of the chromiferous dyestuff obtainable as described in the first and second paragraphs of Example 1 and 10 parts of crystalline sodium sulfate. 2 parts of acetic acid of 40 percent strength are added, the bath is raised to the boil in the course of ½ hour and dyeing is carried on at the boil for ¾ hour.

Finally the wool is rinsed with cold water and dried. There is obtained a yellowish red-brown dyeing.

A similar result is obtained without the addition of acetic acid to the dyebath.

What is claimed is:

1. A complex chromium compound containing, bound in complex union with one atom of chromium, two different monoazo-dyestuff molecules of which one corresponds to the formula

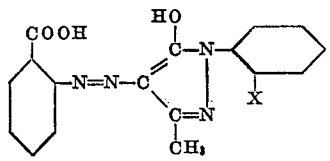

and the other corresponds to the formula

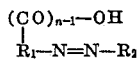

in which formulae X represents a member selected from the group consisting of a chlorine atom and a lower alkyl group, $R_1$ represents a benzene radical free from sulfonic and carboxylic acid groups other than the $(CO)_{n-1}$—OH group, the latter being in ortho-position relative to the azo linkage, $n$ represents a whole number up to 2 and $R_2$ represents the radical of an aromatic carbocyclic coupling component bound to the azo linkage in vicinal position to an hydroxyl group.

2. A complex chromium compound containing, bound in complex union with one atom of chromium, two different monoazo-dyestuff molecules of which one corresponds to the formula

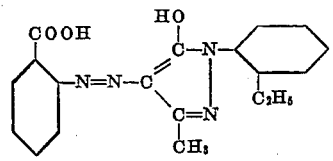

and the other corresponds to the formula

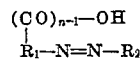

wherein $n$ represents a whole number up to 2, $R_1$ represents a benzene radical bound to the azo linkage in ortho-position relatively to the $(CO)_{n-1}$—OH group and $R_2$ represents a member selected from the group consisting of a benzene and a naphthalene radical bound to the azo linkage in vicinal position relatively to an hydroxyl group, —$R_1$—N=N—$R_2$ containing the said

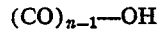

group as sole water-solubilizing group.

3. A complex chromium compound containing, bound in complex union with one atom of chromium, two different monoazo-dyestuff molecules of which one corresponds to the formula

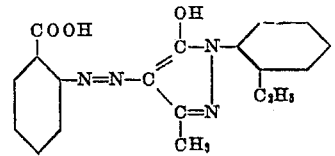

and the other corresponds to the formula

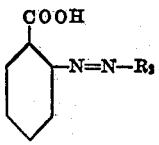

wherein $R_2$ represents a 2-hydroxy naphthalene radical bound to the azo linkage in 1-position and free from sulfonic and carboxylic acid groups.

4. A complex chromium compound containing, bound in complex union with one atom of chromium, two different monoazo-dyestuff molecules of which one corresponds to the formula

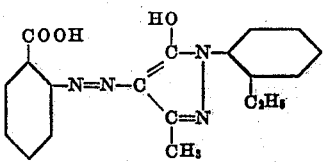

and the other is free from sulfonic and carboxylic acid groups, and corresponds to the formula

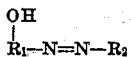

wherein $R_1$ represents a benzene radical bound to the azo linkage in ortho-position relatively to the OH-group and $R_2$ represents a hydroxybenzene radical bound to the azo linkage in ortho-position relatively to the hydroxyl group.

5. A complex chromium compound containing, bound in complex union with one atom of chromium, two different monoazo-dyestuff molecules of which one corresponds to the formula

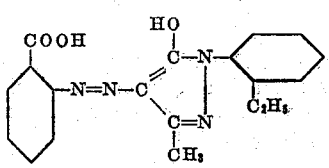

and the other is free from sulfonic and carboxylic acid groups, and corresponds to the fromula

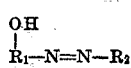

wherein $R_1$ represents a benzene radical bound to the azo linkage in ortho-position relatively to the OH-group and $R_2$ represents a 1-acylamino-7-hydroxynaphthalene radical bound in 8-position to the azo linkage.

6. A complex chromium compound containing, bound in complex union with one atom of chromium, two different monoazo-dyestuff molecules of which one corresponds to the formula

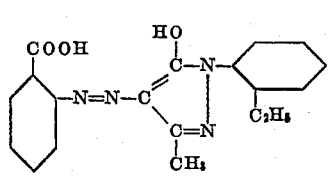

and the other is free from sulfonic and carboxylic acid groups, and corresponds to the formula

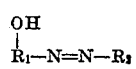

wherein $R_1$ represents a benzene radical bound to the azo linkage in ortho-position relatively to the OH-group and $R_2$ represents a 1-hydroxy-naphthalene radical bound in 2-position to the azo linkage.

7. The complex chromium compound containing one atom of chromium bound in complex union with substantially one molecule of each of the monoazo-dyestuffs corresponding to the formulae

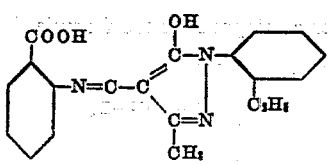

and

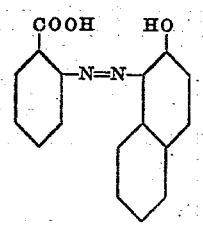

8. The complex chromium compound containing one atom of chromium bound in complex unit with substantially one molecule of each of the monoazo-dyestuffs corresponding to the formulae

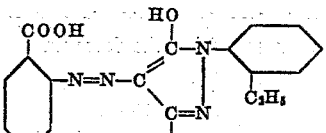

and

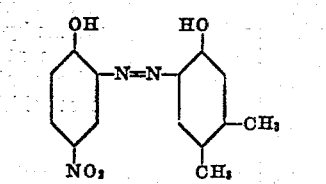

9. The complex chromium compound containing one atom of chromium bound in complex union with substantially one molecule of each of the monoazo-dyestuffs corresponding to the formulae

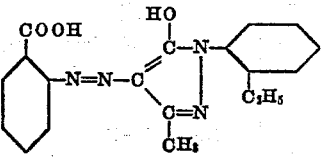

and

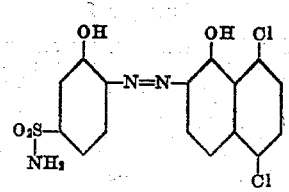

10. The complex chromium compound containing one atom of chromium bound in complex union with substantially one molecule of each of the monoazo-dyestuffs corresponding to the formulae

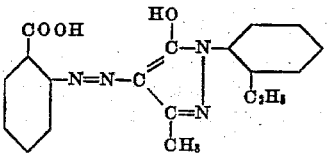

and

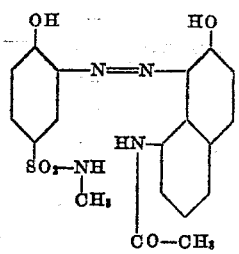

References Cited in the file of this patent
UNITED STATES PATENTS

| | | |
|---|---|---|
| 2,028,981 | Krzikalla et al. | Jan. 28, 1936 |
| 2,464,322 | Krebser et al. | Mar. 15, 1949 |
| 2,673,199 | Widmer et al. | Mar. 23, 1954 |
| 2,711,404 | Schetty | June 21, 1955 |

FOREIGN PATENTS

| | | |
|---|---|---|
| 513,360 | Belgium | Feb. 6, 1953 |

UNITED STATES PATENT OFFICE
Certificate of Correction

Patent No. 2,832,760                            April 29, 1958

Christian Zickendraht et al.

It is hereby certified that error appears in the printed specification of the above numbered patent requiring correction and that the said Letters Patent should read as corrected below.

Column 11, lines 1 to 8, the formula should appear as shown below instead of as in the patent—

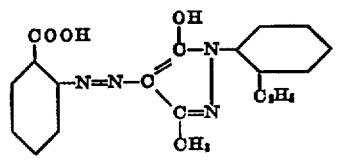

Signed and sealed this 21st day of October 1958.

[SEAL]

Attest:
KARL H. AXLINE,
*Attesting Officer.*

ROBERT C. WATSON,
*Commissioner of Patents.*